US009716676B2

(12) United States Patent
Yoon et al.

(10) Patent No.: US 9,716,676 B2
(45) Date of Patent: Jul. 25, 2017

(54) METHOD FOR PROVIDING INSTANT MESSAGING SERVICE IN THIRD-PARTY SERVICE AND INSTANT MESSAGING SERVER APPARATUS FOR PROVIDING THE MESSAGING SERVICE

(71) Applicant: NCsoft Corporation, Seoul (KR)

(72) Inventors: Hee Kyong Yoon, Seoul (KR); Dong Jin Lee, Seoul (KR)

(73) Assignee: NCSOFT CORPORATION, Seoul (KR)

( * ) Notice: Subject to any disclaimer, the term of this patent is extended or adjusted under 35 U.S.C. 154(b) by 359 days.

(21) Appl. No.: 14/337,217

(22) Filed: Jul. 22, 2014

(65) Prior Publication Data
US 2015/0026273 A1    Jan. 22, 2015

(30) Foreign Application Priority Data

Jul. 22, 2013 (KR) ........................ 10-2013-0085864

(51) Int. Cl.
*H04L 12/58*    (2006.01)
(52) U.S. Cl.
CPC .................................. *H04L 51/04* (2013.01)
(58) Field of Classification Search
CPC ................................................... H04L 51/046
USPC ................................................. 709/203, 206
See application file for complete search history.

(56) References Cited

U.S. PATENT DOCUMENTS

| | | | |
|---|---|---|---|
| 7,580,977 | B1 | 8/2009 | Oran |
| 2003/0195928 | A1* | 10/2003 | Kamijo ............... H04L 12/1818 709/204 |
| 2010/0205541 | A1* | 8/2010 | Rapaport ............... G06Q 10/10 715/753 |

FOREIGN PATENT DOCUMENTS

| | | |
|---|---|---|
| CN | 101119215 A | 2/2008 |
| KR | 100883032 B1 | 1/2009 |
| KR | 1020090060383 A | 6/2009 |
| KR | 1020090075123 A | 7/2009 |
| KR | 1020100022871 A | 3/2010 |

OTHER PUBLICATIONS

Office action issued on Jan. 26, 2017 from China Patent Office in a counterpart China Patent Application No. 201410350150.5.

* cited by examiner

*Primary Examiner* — David Lazaro
*Assistant Examiner* — Zia Khurshid
(74) *Attorney, Agent, or Firm* — The PL Law Group, PLLC

(57) ABSTRACT

Disclosed is a method for providing an instant messaging service in a third-party service and an instant messaging server apparatus for providing the messaging service. The instant messaging service provision server according to an embodiment includes: an interest information collection module for collecting user interest information of a third-party service terminal from the terminal; a reception module for receiving a request for provision of a list of open chat rooms from the third-party service terminal; and a messaging service provision module for managing a list of a plurality of open chat rooms and providing the third-party service terminal with a list of open chat rooms associated with the user interest information of the third-party service terminal, according to the request.

13 Claims, 3 Drawing Sheets

METHOD FOR PROVIDING INSTANT MESSAGING SERVICE IN THIRD-PARTY SERVICE AND INSTANT MESSAGING SERVER APPARATUS FOR PROVIDING THE MESSAGING SERVICE

CROSS-REFERENCE TO RELATED APPLICATION

This application claims priority to and the benefit of Korean Patent Application No. 10-2013-0085864, filed on Jul. 22, 2013, the disclosure of which is incorporated herein by reference in its entirety.

BACKGROUND

1. Field of the Invention

The present invention relates to a technology for providing an instant messaging service in a third-party service linked to the instant messaging service.

2. Description of the Related Art

An instant messaging service refers to a service for enabling a user connected to an Internet network or a mobile communication network to transmit, receive, and check an instant message in real-time through a messenger. In related art, the instant messaging service is mainly provided through personal computers (PCs). However, there has recently been a rapidly increasing tendency to provide the messaging service through portable terminals, such as smartphones.

In general, the instant messaging service has mainly focused on a user's chatting with acquaintances and provision of file transmission and reception functions. However, as user demands have diversified and competition between messengers is growing, a need to provide various functions in addition to basic functions of the messaging service has gradually increased.

Therefore, a third-party service linked to a messaging service is increasingly provided separately from the messaging service. The third-party service refers to the practice of a provider of the instant messaging service, or a separate third-party service provider, providing a supplementary function that links with the instant messaging service. For example, the third-party service provider may provide a supplementary service, such as a game, in the instant messaging service or through a separate application. In this case, the third-party service provider may enjoy a game with acquaintances by using friend relationships set in the instant messaging service.

As described above, the third-party service frequently uses the friend relationships set in the instant messaging service linked thereto, and the user may have more opportunities to interact with his/her acquaintances or friends due to the characteristics of the service. However, in order for the user to use a messaging service in an existing third-party service, an inconvenience exists wherein the user must terminate the third-party service and then separately execute the messaging service. Therefore, there is a need for a method to efficiently use the messaging service in the third-party service.

SUMMARY

Embodiments of the present invention provide units for providing an instant messaging service in a third-party service linked to the instant messaging service.

According to an aspect of the present invention, provided is an instant messaging service provision server including: an interest information collection module for collecting user interest information input by a user of a third-party service terminal or derived from a service use pattern of the user from the third-party service terminal; a reception module for receiving a request for provision of a list of open chat rooms from the third-party service terminal; and a messaging service provision module for managing a list of a plurality of created open chat rooms and providing the third-party service terminal with a list of open chat rooms, including a theme associated with the user interest information of the third-party service terminal which is collected from the interest information collection module, according to the request for provision of a list of open chat rooms.

The reception module may receive the request for provision of a list of open chat rooms through an open chat room access link provided to the third-party service terminal.

The messaging service provision module may provide a list of open chat rooms associated with a third-party service that is currently being used in the third-party service terminal to the third-party service terminal.

The messaging service provision module may receive a terminal user's friend list set in a third-party service from a third-party service provision server, which is currently being used by the third-party service terminal, and provide the received friend list to the third-party service terminal.

The messaging service provision module may relay transmission and reception messages between the terminal user and other users included in the friend list according to a request from the third-party service terminal.

The transmission and reception of messages may include at least one of a text message and a voice message.

According to another aspect of the present invention, provided is a method for providing an instant messaging service, including: collecting, by an instant messaging server, user interest information input by a user of a third-party service terminal or derived from a service use pattern of the user from the third-party service terminal; receiving, by the instant messaging server, a request for provision of a list of open chat rooms from the third-party service terminal; and providing, by the instant messaging server, the third-party service terminal with a list of open chat rooms including a theme associated with the user interest information of the third-party service terminal, which is collected from the interest information collection module among a list of a plurality of created open chat rooms, according to the received request for provision of a list of open chat rooms.

The receiving of the request for provision of a list of open chat rooms may include receiving the request for provision of a list of open chat rooms through an open chat room access link provided to the third-party service terminal.

The providing of the list of open chat rooms may further include providing a list of open chat rooms associated with a third-party service that is currently being used in the third-party service terminal to the third-party service terminal.

The providing of the list of open chat rooms may further include: receiving a terminal user's friend list set in a third-party service from a third-party service provision server which is currently being used by the third-party service terminal; and providing the received friend list to the third-party service terminal.

The method may further include: after providing the friend list, receiving a request for chatting with one or more other users included in the friend list from the third-party service terminal; and relaying transmission and reception of messages between the terminal user and the one or more other users according to the request for chatting. The transmission and reception of messages may include at least one of a text message and a voice message.

BRIEF DESCRIPTION OF THE DRAWINGS

The above and other embodiments of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Hereinafter, specific embodiments of the present invention will be described with reference to the accompanying drawings. However, the following embodiments are merely provided as examples, and the present invention is not limited thereto.

In describing the present invention, descriptions of well-known techniques related to the present invention are omitted so as not to unnecessarily obscure the embodiments of the present invention. The terms used below are defined in consideration of the functions of the present invention and may be changed according to a user's or operator's intentions or customs. Thus, the terms shall be defined based on the embodiments described throughout the specification.

Figure 1:
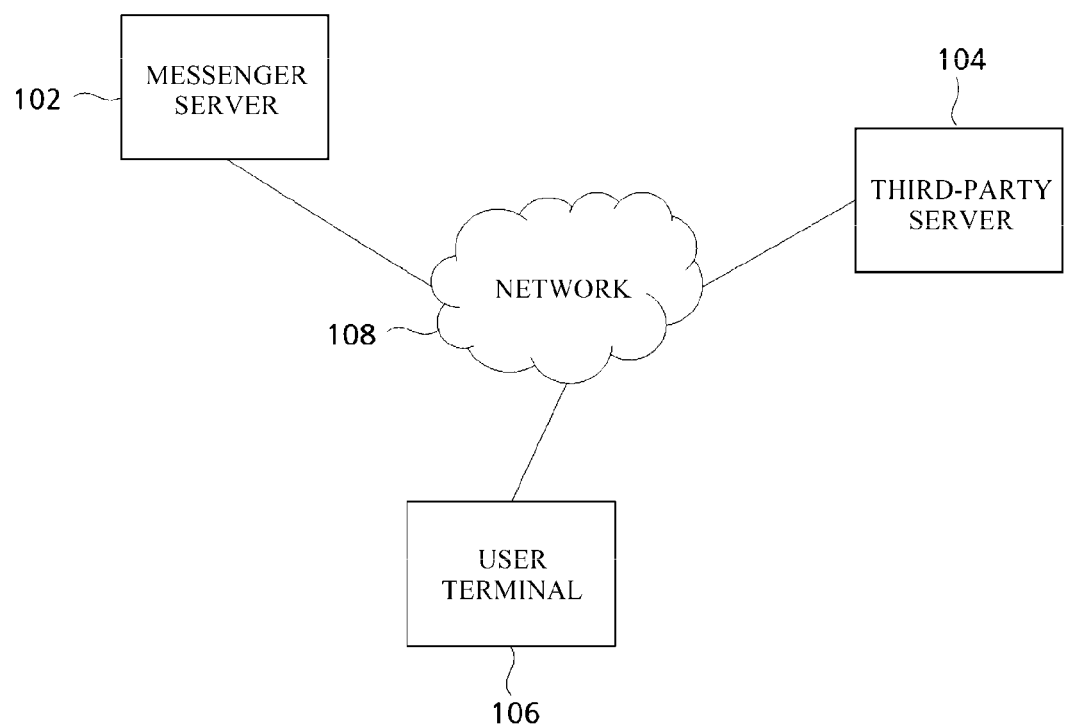
FIG. 1 is a block diagram illustrating a messaging service provision system according to an embodiment of the present invention.

FIG. 1 is a block diagram for describing a messaging service provision system 100 according to an embodiment of the present invention. Referring to FIG. 1, the messaging service provision system 100 according to an embodiment of the present invention includes a messenger server 102, a third-party server 104, and a user terminal 106. Herein, the messenger server 102 may be also referred to as "an instant messaging service provision server."

The messenger server 102 is a server for providing an instant messaging service to the user terminal 106. That is, the user terminal 106 enables a user to create a chat room, invite other users to the created chat room, and perform chatting by using the messenger server 102. In this case, chatting between users is intended to include not only the exchange of general text messages, but also the exchange of media data, such as photos, moving images, voice data, and voice chatting using voice, between users. That is, the user of the instant messaging service may perform text chatting or voice chatting with users participating in the chat room.

According to an embodiment, the messenger server 102 may store and manage a friend list for each subscribed user. The friend list refers to a list of other users that a user registers. According to an embodiment, when a specific user requests the addition of another user as a friend, the messenger server 102 may add the other user to the friend list of the specific user either immediately or after the other user has been approved. When the friend list for the user using the instant messaging service is provided, the user may create a chat room and then select users to participate in the created chat room from his or her friend list.

According to an embodiment, the messenger server 102 may store and manage interest information for each of the subscribed users. The interest information includes tastes, preferences, interests, or the like for each user and may be classified according to keywords or categories. For example, a user may set his or her interests by directly inputting his or her desired keywords, or by selecting one or more items of a previously classified category. In addition, the messenger server 102 may update the user interest information automatically according to a service use pattern of the user, or the like. For example, when a specific user uses a specific third-party service, the messenger server 102 may add the third-party service itself to the interest information as a keyword, or add a category to which the third-party service belongs to the specific user's interest information. For example, embodiments of the present invention are not limited to a specific configuration of interest information or a specific interest information collection method, and may be configured to store and manage interest information according to various configurations and interest information collection methods according to different needs.

On the other hand, the user of the instant messaging service may create an open chat room by using the messenger server 102. The difference between the open chat room and a general chat room is that, in the general chat room, a chat room host or a user participating in a chat room permits only certain users to participate in the general chat room, whereas in the open chat room, any user that wants to participate in the open chat room is capable of entering the open chat room. To this end, the open chat room may have a unique address (e.g., a uniform resource locator (URL)) for access to the open chat room. That is, a user that wants to participate in a specific open chat room inputs a unique address of the specific open chat room via using the user terminal 106, or executes a link including the unique address, thereby participating in the specific open chat room. Furthermore, according to another embodiment, the unique address may be provided in the form of a quick response (QR) code or a bar code. In this case, the user may participate in an open chat room by scanning a relevant QR code using the user terminal 106.

In embodiments of the present invention, created open chat rooms may have respective themes. The themes of the open chat rooms are for representing the characteristics or features of the created open chat rooms. For example, the themes may be expressed by keywords (i.e., tags) or categories that are input by open chat room hosts. For example, when the user creates an open chat room associated with a specific professional baseball team, the theme of the open chat room may be the team name of the specific professional baseball team, or may be a keyword or category, such as baseball or sports, for explaining a relevant bulletin board.

The third-party server 104 is a server for providing a supplementary service (i.e., a third-party service) that is not provided by the messenger server 102, but through interoperation with the messenger server 102. For example, the third-party server 104 may be a server for providing an online game linked to the messenger server 102. Therefore, a user of the instant messaging service may enjoy a game with his/her friends, or share a game score or the like with his/her friends, using the third-party server 104.

The third-party server 104 may be configured to use a friend relationship set in the messenger server 102 as is, or generate a separate friend relationship in the third-party server 104, depending on the characteristics of the service to be provided. In this case, the third-party server 104 may also be configured to store and manage friend lists for respective users like the messenger server 102.

In order to provide such a third-party service, the third-party server 104 may provide a separate third-party application for provision of a supplementary service separately from the messaging application that is provided by the messenger server 102, and is installed in the user terminal 106 and may provide the supplementary service using the third-party application. That is, a user that intends to use the third-party service may enable a relevant third-party application to be installed in his or her user terminal 106, and enable the installed third-party application to be executed, thereby using the third-party service.

The user terminal 106 is user equipment that is used to receive the messaging service or the supplementary service through the messenger server 102 or the third-party server 104. For example, a personal information device, such as a desktop computer or a notebook computer, or a portable information device, such as a tablet personal computer or a smartphone, may be the user terminal 106 according to the present invention.

As described above, the messaging application and the third-party application described above are installed in the user terminal 106. Therefore, the user may use a service that he or she wants to receive by enabling a desired application to be executed. As above, a terminal including a third-party application for provision of a third-party service is referred to as "a third-party service terminal."

The third-party application installed in the user terminal 106 may include an in-app link (i.e., an open chat room access link) for accessing an open chat room list provided by the messenger server 102 while the user uses the third-party service. Therefore, the user may access the open chat room within the third-party application by selecting (e.g., touching or clicking) the in-app link while using the third-party application.

In addition, the third-party application may include a functional module for performing text chatting or voice chatting with other users in the chat room that the user accesses. That is, the user may chat with the other users within the chat room through not only the messaging application, but also the third-party application. A result from chatting may be reflected in the open chat room or a relevant chat room as is.

On the other hand, the messenger server 102, the third-party server 104, and the user terminal 106 are configured to mutually transmit and receive data through the network 108. In embodiments of the present invention, the network 108 is an apparatus for serving as an intermediation of transmission and reception of packets between devices connected thereto or a set of the apparatuses. The network 108 may include all types of communication networks, generally used in the related art, for example, a mobile communication network, such as a third generation (3G) network or a Long Term Evolution (LTE) network and wired/wireless Internet network.

Figure 2:
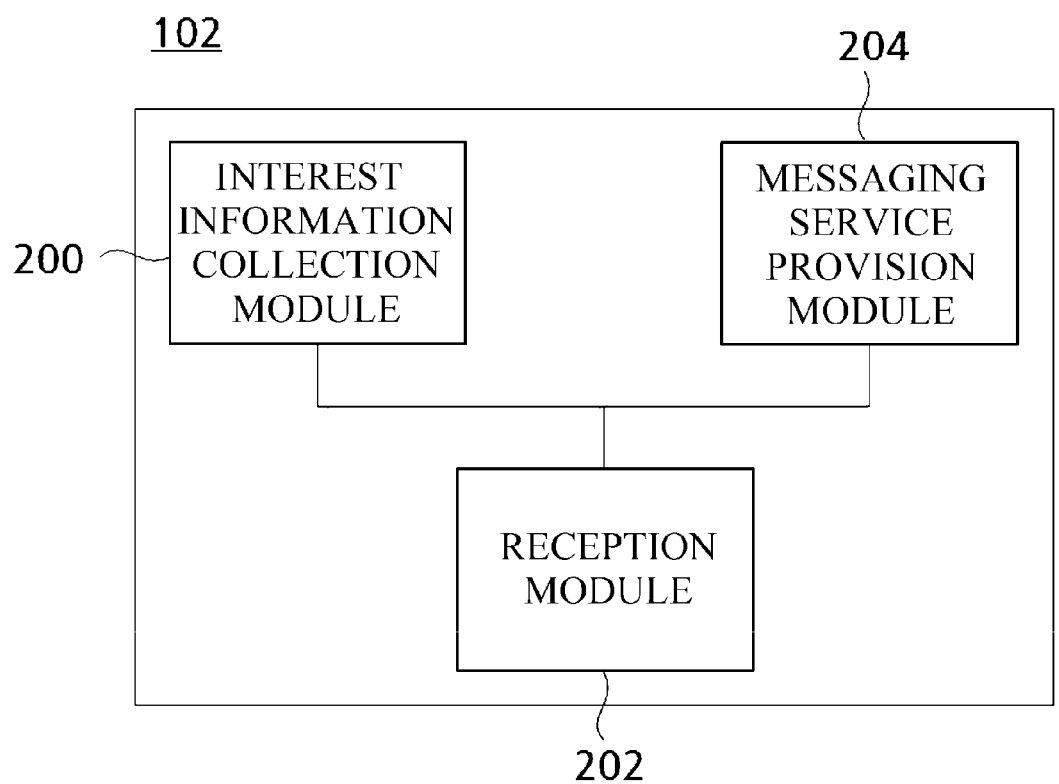
FIG. 2 is a block diagram illustrating a detailed configuration of an instant messaging service provision server according to an embodiment of the present invention.

FIG. 2 is a block diagram illustrating a detailed configuration of an instant messaging service provision server 102 according to an embodiment of the present invention. Referring to FIG. 2, the detailed configuration of an instant messaging service provision server 102 according to the embodiment of the present invention includes an interest information collection module 200, a reception module 202, and a messaging service provision module 204.

The interest information collection module 200 collects interest information of a user using the user terminal 106 from the user terminal 106 and stores the interest information. For example, the interest information collection module 200 may collect and store the interest information by directly receiving a keyword or a category item wanted by the user through the user terminal 106 or by tracking a service use pattern of the user.

The reception module 202 receives a request for provision of a list of open chat rooms from the user terminal 106 using a third-party service. As described above, the user terminal 106 may request the reception module 202 to provide a list of currently created open chat rooms by using an in-app link included in a third-party application while using the third-party service through the third-party application.

The messaging service provision module 204 provides the list of open chat rooms to the user terminal 106 in response to the request for provision of a list of open chat rooms from the user terminal 106. In this case, the messaging service provision module 204 is configured to provide only a list of open chat rooms associated with interest information according to the user's interest information collected by the interest information collection module 200 to the user terminal 106, rather than merely providing a list of all currently open chat rooms to the user terminal 106. For example, when a user that requests provision of a list of open chat rooms is interested in sports, the messaging service provision module 204 may provide only a list of open chat rooms with themes associated with sports among currently open chat rooms to the user terminal 106. According to the above-described configuration, the user may be provided with only a list of open chat rooms that may be relevant to the user or in which the user may be interested, thereby making it possible to provide a user-specific service.

In addition, according to an embodiment, the messaging service provision module 204 may provide a list of open chat rooms associated with a third-party service that is currently being used in the user terminal 106 to the user terminal 106. For example, when the user terminal 106 requests a list of open chat rooms in a specific third-party game application, the messaging service provision module 204 may provide a list of open chat rooms associated with the game application to the user terminal 106. Generally, when the user requests a list of open chat rooms on a third-party application, the user often intends to use a chat room associated with the third-party application. According to the above-described configuration, the user may more easily find a list of chat rooms that he or she wants.

In addition, according to an embodiment, the messaging service provision module 204 may receive a user's friend list set in the third-party service using the user terminal 106 from the third-party server 104 that is currently being used by the user terminal 106, and may provide the received friend list to the user terminal 106. That is, the messaging service provision module 204 provides the user's friend list set in the third-party service to the user to enable the user to chat with friends within the third-party service during use of the third-party service. To this end, the third-party application may include modules for relaying in-app chatting with friends selected by the user. In addition, the module may be configured to perform media data transmission and reception for voice chatting in addition to general text message transmission and reception.

According to the above-described configuration, the user may receive the instant messaging service for chatting with the user's friends set in the third-party service even when the third-party service that is currently being used is not terminated, thereby enhancing user convenience during use of the third-party service. For example, when users use a specific online game as a third-party service, the users may enjoy the game while exchanging information with each other using a voice chatting service with their friends or guild members in the game.

Figure 3:
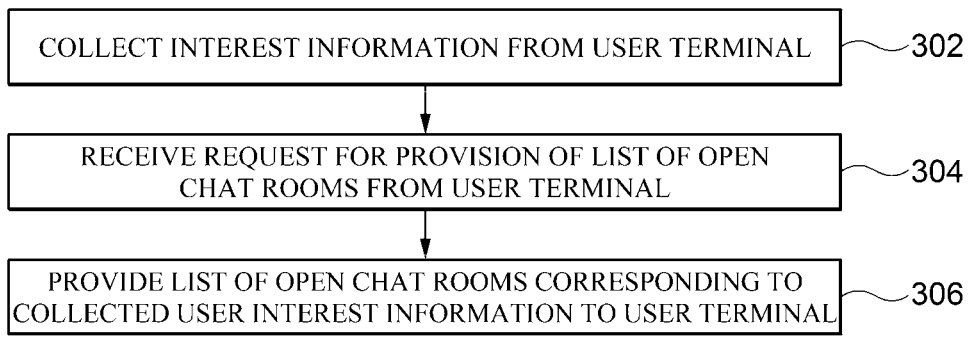
FIG. 3 is a flowchart illustrating a method for providing an instant messaging service according to an embodiment of the present invention.

FIG. 3 is a flowchart for describing a messaging service provision method 300 according to an embodiment of the present invention. First, the messenger server 102 collects user interest information of the user terminal from the user terminal 106 (302). Since the configuration for collecting the user interest information and related details have been previously described, a repeated description will be omitted here.

Thereafter, the messenger server 102 receives a request for provision of a list of open chat rooms from the user terminal 106 that uses a third-party service (304). In this case, the messenger server 102 may be configured to receive the request for provision of a list of open chat rooms through an open chat room access link included in a third-party application installed in the user terminal 106.

Next, the messenger server 102 provides the list of open chat rooms corresponding to the user interest information of the user terminal 106 that has sent the request to the user terminal 106 (306). As described above, the messenger server 102 may be configured to provide the user terminal 106 with the list of open chat rooms associated with the third-party service that is currently being used in the user terminal 106.

In addition, the messenger server 102 may receive a terminal user's friend list set in the third-party service from the third-party server 104 that is currently being used by the user terminal 106, and provide the received friend list to the user terminal 106. Thereafter, when a request for chatting with one or more other users included in the friend list is received from the user terminal 106, the messenger server 102 may relay transmission and reception of messages between the one or more other users and the terminal user according to the request for chatting.

According to the embodiments of the present invention, when a user of an instant messaging service uses a third-party service linked to the instant messaging service, the user may use an open chat room service provided by the instant messaging service by performing a simple manipulation in the third-party service.

In addition, when the user uses the open chat room service during the third-party service, a user-specific open chat room list is provided according to the user's interests or a type of the third-party service, thereby improving user convenience during use of the open chat room service.

In addition, when the instant messaging service is provided during provision of the third-party service, the user's friend list set in the third-party service is also provided, thereby enabling friends set in the third-party service to easily use the messaging service.

On the other hand, an embodiment according to the present invention may include a computer-readable recording medium storing a program that, when executed by a computer, causes the computer to perform the methods described herein. The computer-readable recording medium may include program commands, local data files, and local data structures either alone or in combination. The medium can be specially designed and constructed for the present invention, or can be known and usable by anyone skilled in computer software. Examples of the computer-readable recording medium include magnetic recording media, such as hard disks, floppy disks and magnetic tapes, optical recording media, such as CD-ROMs and DVDs, magneto-optical recording media, such as floppy disks, and hardware devices, such as ROMs, RAMs and flash memories that are especially configured to store and execute program commands. Examples of the program commands may include machine language codes that may be generated by a compiler, and high-level language codes that may be executed by a computer by using an interpreter.

Also, while this invention has been particularly shown and described with reference to the embodiments thereof, it will be understood by those skilled in the art that various changes in form and details may be made therein without departing from the spirit and scope of the invention as defined by the appended claims.

Therefore, the scope of the invention is defined not by the detailed description of the invention, but by the appended claims, and all differences within the scope will be construed as being included in the present invention.

What is claimed is:

1. An instant messaging service provision server, comprising:
   an interest information collection module executed by a hardware device that collects user interest information input by a user of a third-party service terminal or derived from a service use pattern of the user from the third-party service terminal;
   a reception module executed by a hardware device that receives a request for provision of a list of open chat rooms from the third-party service terminal; and
   a messaging service provision module executed by a hardware device that manages a list of a plurality of created open chat rooms each having a theme and provides the third-party service terminal with the list of open chat rooms having a theme associated with the user interest information collected from the interest information collection module, according to the request for provision of the list of open chat rooms,
   wherein the messaging service provision module receives a service terminal user's friend list set in a third-party service, which is currently being used by the third-party service terminal, from a third-party service provision server, provides the received friend list to the third-party service terminal, and relays transmission and reception of messages between the service terminal user and other users included in the friend list according to a request from the third-party service terminal, without terminating the third-party service.

2. The instant messaging service provision server of claim 1, wherein the reception module receives the request for provision of the list of open chat rooms through an open chat room access link provided to the third-party service terminal.

3. The instant messaging service provision server of claim 1, wherein the messaging service provision module provides the list of open chat rooms associated with a third-party service that is currently being used in the third-party service terminal to the third-party service terminal.

4. The instant messaging service provision server of claim 1, wherein the transmission and reception of the messages include at least one of a text message and a voice message.

5. The instant messaging service provision server of claim 1, wherein the interest information collection module adds the third-party service used in the third-party service terminal to the user interest information or adds a category to which the third-party service belongs to the user interest information.

6. An instant messaging service provision server that exchanges data with a third-party server and a third-party service terminal on which a messenger application and a third-party application are installed through a network, the instant messaging service provision server comprising:
- an interest information collection module executed by a hardware device that collects user interest information input by a user of the third-party service terminal or derived from a service use pattern of the user from the third-party service terminal;
- a reception module executed by a hardware device that receives a request for provision of a list of open chat rooms from the third-party service terminal; and
- a messaging service provision module executed by a hardware device that provides the third-party service terminal with the list of open chat rooms having a theme associated with the user interest information collected from the interest information collection module, according to the request for provision of the list of open chat rooms,
- wherein the messaging service provision module receives a service terminal user's friend list set in a third-party service, which is currently being used by the third-party service terminal, from a third-party service provision server and provides the received friend list to the third-party service terminal; and
- the third-party application includes a module for relaying in-app chatting with friends selected by the user, without terminating the third-party service.

7. The instant messaging service provision server of claim 6, wherein the messaging service provision module provides the third-party service terminal only with the list of open chat rooms having the theme associated with the user interest information.

8. The instant messaging service provision server of claim 6, wherein the list of open chat rooms having the theme associated with the user interest information is a list of open chat rooms associated with a third-party service that is currently being used in the third-party service terminal.

9. A method for providing an instant messaging service, comprising:
- collecting, by an instant messaging server, user interest information input by a user of a third-party service terminal or derived from a service use pattern of the user from the third-party service terminal;
- receiving, by the instant messaging server, a request for provision of a list of open chat rooms from the third-party service terminal; and
- providing, by the instant messaging server, the third-party service terminal with a list of open chat rooms including a theme associated with the user interest information collected from the interest information collection module among a list of a plurality of created open chat rooms each having a theme, according to the received request for provision of the list of open chat rooms,
- wherein the providing of the list of open chat rooms further comprises:
- receiving a service terminal user's friend list set in a third-party service, which is currently being used by the third-party service terminal, from a third-party service provision server;
- providing the received friend list to the third-party service terminal;
- receiving a request for chatting with one or more other users included in the friend list from the third-party service terminal; and
- relaying transmission and reception of messages between the service terminal user and the one or more other users according to the request for chatting, without terminating the third-party service.

10. The method of claim 9, wherein the receiving of the request for provision of a list of open chat rooms comprises receiving the request for provision of the list of open chat rooms through an open chat room access link provided to the third-party service terminal.

11. The method of claim 9, wherein the providing of the list of open chat rooms further comprises providing the list of open chat rooms associated with a third-party service that is currently being used in the third-party service terminal to the third-party service terminal.

12. The method of claim 9, wherein the transmission and reception of messages include at least one of a text message and a voice message.

13. The method of claim 9, wherein in the collecting of the user interest information, the third-party service used in the third-party service terminal is added to the user interest information, or a category to which the third-party service belongs is added to the user interest information.

* * * * *